United States Patent [19]

Palombari et al.

[11] 3,725,591

[45] Apr. 3, 1973

[54] SYNCHRONIZATION NETWORK FOR PCM MULTIPLEXING SYSTEMS

[75] Inventors: Maurizio Palombari; Luciano Di Biago, both of Milan, Italy

[73] Assignee: Societa Italiana Telecomunicazioni Siemens S.p.A., Milan, Italy

[22] Filed: Feb. 7, 1972

[21] Appl. No.: 224,197

[30] Foreign Application Priority Data

Feb. 9, 1971 Italy ............................20346 A/71

[52] U.S. Cl. ..........................179/15 AF, 179/15 BS

[51] Int. Cl. ..............................................H04j 3/06

[58] Field of Search ...179/15 AF, 15 BS; 178/69.5 R

[56] References Cited

UNITED STATES PATENTS

| | | | |
|---|---|---|---|
| 3,663,760 | 5/1972 | DeWitt | 179/15 AF |
| 3,573,752 | 4/1971 | Lyghounis | 179/15 AF |
| 3,504,287 | 3/1970 | Deregnaucourt | 179/15 AF |

*Primary Examiner*—Kathleen H. Claffy
*Assistant Examiner*—David L. Stewart
*Attorney*—Karl F. Ross

[57] ABSTRACT

At a multiplexing station serving for the bit-by-bit interleaving of binary pulse trains received from a plurality of feeder channels for retransmission over a common signal path, the bits of each incoming train are stored in a multistage register for a period approximately equaling the length of a scanning cycle during which the several memories are successively sampled, in repeated subcycles, by reading pulses recurring at a rate substantially higher than the bit rate of the individual trains. The storage period of a particular register , measured by a first counter which is stepped by a series of clock pulses recurring at the bit rate, and the corresponding scanning cycle, measured by a second counter in response to the recurrent reading pulses addressed to that register, are compared once every two scanning cycles by a pair of monitoring pulses flanking a reading pulse; if either monitoring pulse coincides with a timing pulse generated during alternate storage periods of one register stage, the allocation of the reading pulses to the several stages of the register is shifted by feeding into the second counter a corrective pulse advancing the count thereof by the equivalent of half a scanning cycle.

10 Claims, 3 Drawing Figures

SYNCHRONIZATION NETWORK FOR PCM MULTIPLEXING SYSTEMS

Our present invention relates to a network to be used in a multiplexing station at a transmitting terminal of a telecommunication system, particularly of the pulse-code-modulated (PCM) type, in which elemental units of several incoming messages are to be transmitted in interleaved relationship over an outgoing signal path.

In the system more specifically described hereinafter, the massages are pulse trains and their elemental units are individual bits of a primary recurrence rate of cadence (e.g. of 2 bits per $\mu$s) which is low compared with the secondary recurrence rate (e.g. of 8 bits per $\mu$s) at which these bits, after storage in respective multistage registers, are subsequently sampled for intercalation in a composite word to be transmitted. The individual pulse trains, arriving over respective feeder channels, may in turn be synthesized from respective groups of original binary messages.

In such a system it is difficult to maintain exact synchronization between the incoming and outing bits, especially if the several pulse trains arriving over the various feeder channels also differ somewhat in their cadence. Moreover, the need for inserting supplemental bits (e.g. for synchronization with the receiving terminal) in the outgoing word frequently prevents the establishment of a simple numerical relationship between the primary and secondary recurrence rates.

It is, therefore, the general object of our present invention to provide simple and effective means for maintaining a certain phase correlation, sufficient to prevent the loss of significant information, between a primary pulse rate, used for the distribution of successive elemental units of incoming messages to the corresponding register stages, and a secondary pulse rate, used in the sampling of the contents of these stages.

A more particular object is to provide means for achieving such phase correlation even where the primary and/or secondary pulse rates are subject to fluctuation.

A time-sharing telecommunication system according to our invention comprises, at the transmitting end of a signal path which may be a radio link or a trunk line, a plurality of memory sections each including a multistage register for the temporary storage of $k$ elemental units (bits) of incoming messages from $h$ feeder channels. These registers are scanned in cyclic succession by a source of reading signals which sample the contents of respective stages of each section, one stage at a time, during $k$ consecutive subcycles of a scanning cycle whose duration approximately equals the length of a storage period of $k$ clock cycles; the length of a clock cycle may slightly differ from one memory section to another. A distributor, such as a cyclic pulse counter, controls the loading of the several stages of the register in a predetermined order so that the storage periods of the bits in these stages are relatively staggered but of the same duration. A first signal generator, such as a flip-flop, produces a succession of timing signals which are substantially coextensive with alternate storage periods of one particular stage of the associated register, this particular stage being sampled by a reading pulse bracketed by a monitoring signal from a second signal generator under the control of another cyclic pulse counter which receives the reading pulses addressed to this memory section and successively opens a set of $k$ normally blocked readout gates for the several register stages. The monitoring signal, occurring in the presence of a predetermined reading-pulse count, lasts substantially less than a scanning cycle; this monitoring signal, normally occurring once every two cycles, is fed along with the timing signals from the first generator to a logic circuit which, upon detecting a coincidence between these signals, emits a corrective signal to modify the count of the reading-pulse counter to shift the monitoring signal to an interval between successive timing signals, preferably to about the midpoint of that interval. Such a shift also repositions the accompanying reading signal with reference to the storage period of the corresponding register stage and, in view of the small difference in length between a scanning cycle and a storage period, approximately centers also the other reading signals of that memory section with reference to their storage periods. As a result of the shift, the time position of the bits of a given message within the composite word transmitted during a scanning cycle is subject to occasional change; the occurrence of such a shift may be indicated to the remote station by a special supplemental code, or by an individual address code forming part of each incoming pulse train.

According to a more particular feature of our invention, the second signal generator may include a timer (e.g. a flip-flop) triggered by the corrective signal to prevent the recurrence of the monitoring signal for more than one scanning cycle following the modification of the reading-pulse count, thereby avoiding the immediate generation of another corrective signal due to the coincidence of such monitoring signal with the next timing signal.

As more fully described hereinafter, a preferred embodiment of our invention includes a central scanner which emits a leading and a trailing pulse together with each reading pulse destined for a particular memory section; these leading and trailing pulses may coincide with reading pulses addressed to other memory sections of the system. The second signal generator comprises in that case a first gate, unblocked by a certain reading pulse, and a second gate which is unblocked by the next-following count to pass the trailing pulse following the reading pulse of the current subcycle. The flip-flop or equivalent timing device of the second signal generator is triggerable by alternate trailing pulses traversing the second gate to generate a succession of blocking and unblocking signals for the monitoring signal which encompasses the leading and trailing pulses passed by these gates. The corrective signal may be set off by a shift command emitted by a further flip-flop which is set by the joint occurrence of a timing signal, an unblocking signal and either a leading or a trailing pulse clearing the respective gate, this further flip-flop being resettable by the trailing edge of any subsequent reading pulse whose coincidence with the corrective pulse advances the associated counter by $1 + k/2$ steps instead of a single step.

The above and other features of our invention will be described in greater detail hereinafter with reference to the accompanying drawing in which.

Figure 1:
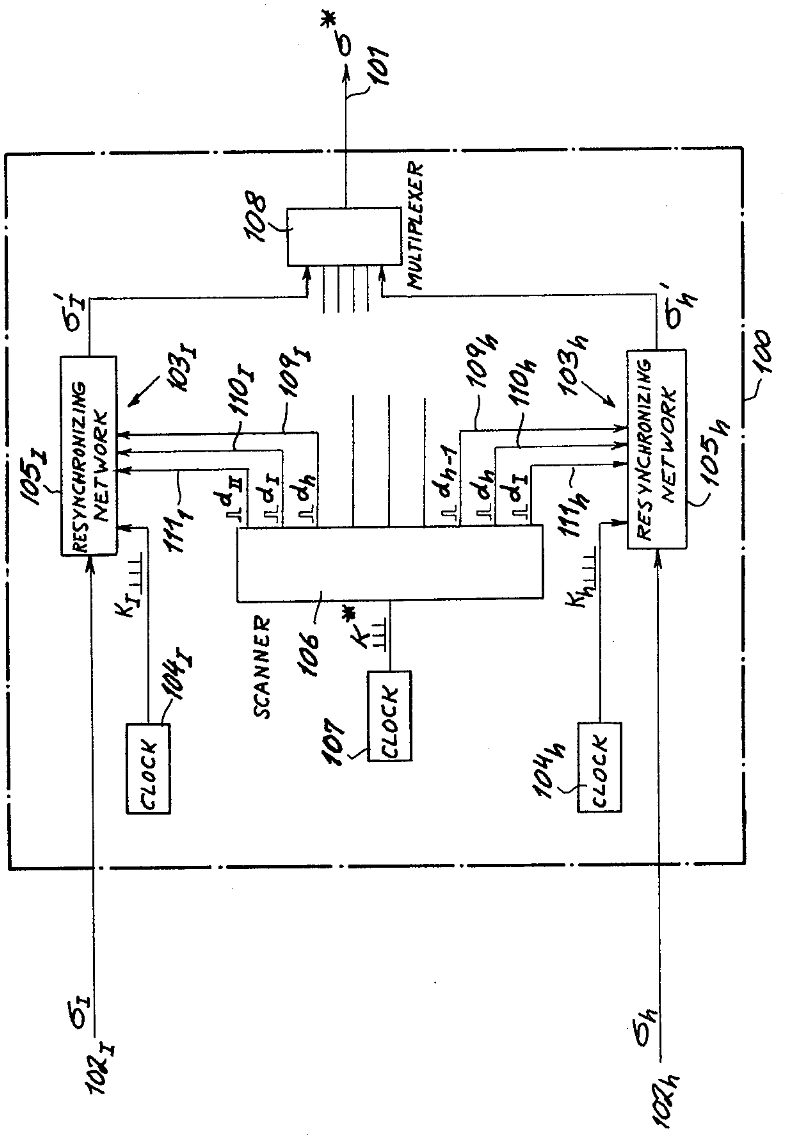
FIG. 1 is a block diagram of a multiplexing station embodying our invention.

The system shown in FIG. 1 comprises a transmitting station 100 which is the input terminal of a telecommunication link 101 and is also the junction point of a number of incoming feeder lines $102_I$ – $102_h$; in the specific instance described hereinafter with reference to FIG. 3, $h$ equals four.

Station 100 includes a plurality of memory sections $103_I$ – $103_h$, one for each feeder line, provided with primary clocks $104_I$ – $104_h$ and resynchronizing networks $105_I$ – $105_h$ embodying our invention. A central scanner 106, common to all the memory sections, is driven by a secondary clock 107. Networks $105_I$ – $105_h$ work into a multiplexing circuit 108 delivering their outputs to channel 101, in bit-by-bit interleaved relationship, as a composite message $\sigma^*$.

The individual messages arriving over lines $102_I$ – $102_h$ are constituted by binary pulse trains $\sigma_I$ – $\sigma_h$ with similar but not necessarily identical bit rates corresponding to the repetition frequencies or cadences of pulse trains $K_I$ – $K_h$ generated by the respective clocks $104_I$ – $104_h$. After temporary storage in networks $105_I$ – $105_h$, the bits of these messages are read out in the form of pulse sequences $\sigma'_I$ – $\sigma'_h$ whose cadence equals that of pulses K* emanating from secondary clock 107.

Figure 2:
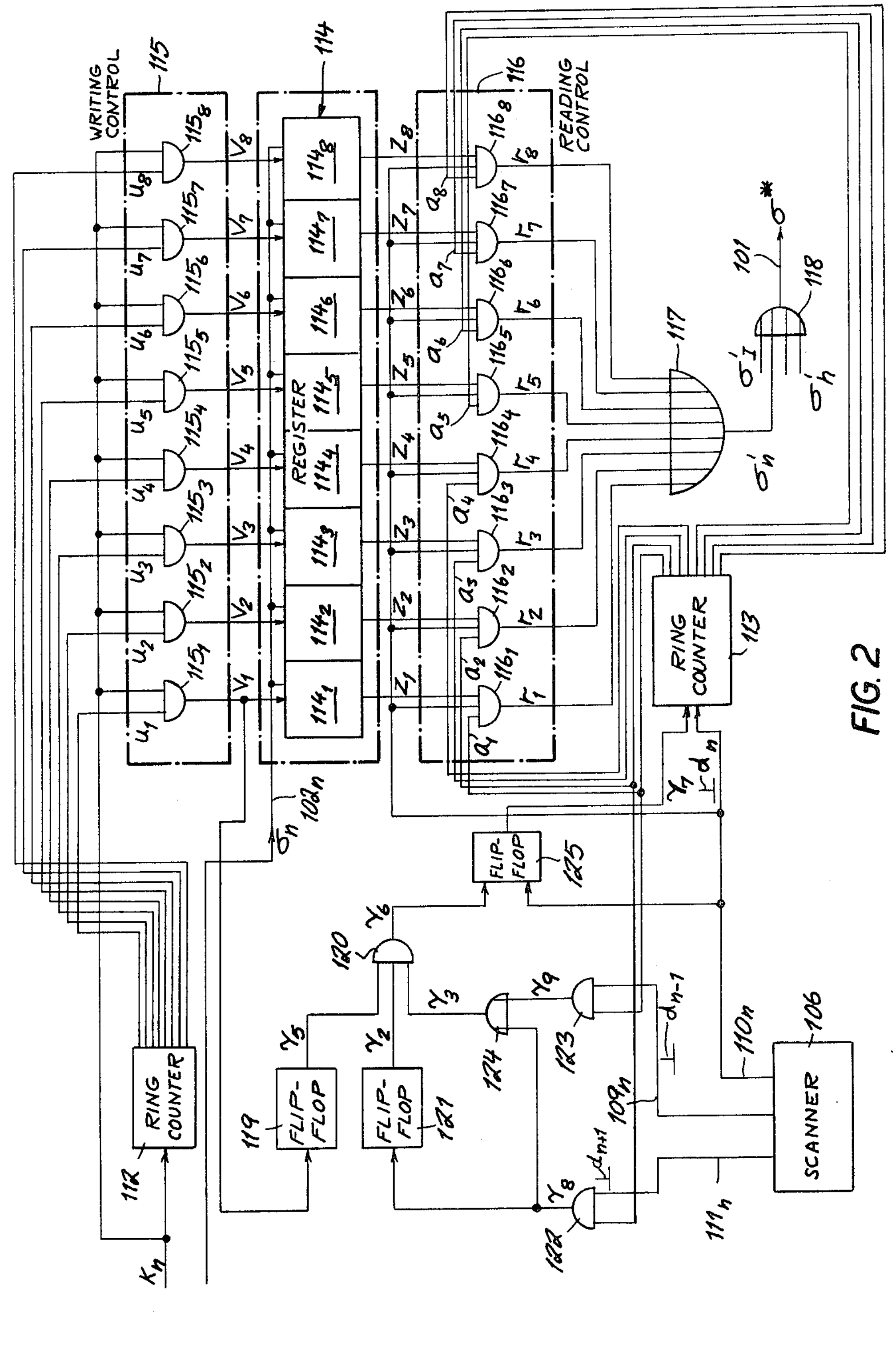
FIG. 2 is a more detailed circuit diagram of a resynchronization network included in the system of FIG. 1.

Scanner 106 is connected to each resynchronizing network $105_I$ – $105_h$ by a set of three leads $109_I$, $110_I$, $111_I$ – $109_h$, $110_h$, $111_h$ carrying respective reading pulses which, in the case of a generic memory section as described below with reference to FIG. 2, are designated $d_{n-1}$, $d_n$ and $d_{n+1}$, respectively. Thus, with a cyclic scan of all the memory sections, leads $109_I$, $110_I$ and $111_I$ carry respective reading pulses $d_h$, $d_I$ and $d_{II}$ whereas leads $109_h$, $110_h$ and $111_h$ carry pulses $d_{h-1}$, $d_h$ and $d_I$. These reading pulses follow one another in the rhythm of the clock pulses K*, each reading pulse being simultaneously transmitted to three different stations including the one designated by its own subscript.

FIG. 2 shows the corresponding leads $109_n$, $110_n$ and $111_n$ transmitting the pulses $d_{n-1}$, $d_n$ and $d_{n+1}$ to the generic resynchronizing network $105_n$. This network comprises a pair of binary ring counters 112, 113 of eight stages each ($k = 8$), it being assumed that incoming line $102_n$ carries approximately 8 bits of message $\sigma_n$ during an operating cycle of scanner 106. These bits are temporarily stored in respective stages $114_1$ – $114_8$ of a register 114 adapted to be loaded in parallel in response to writing pulses $v_1$ – $v_8$ generated by a control circuit 115. This writing-control circuit includes eight AND gates $115_1$ – $115_8$ each with a first input directly receiving the clock pulses $K_n$ and with a second input connected to a respective output of counter 112 for successive energization by pulses $v_1$ – $v_8$. Thus, a bit inscribed in any stage of register 114 remains stored therein for a period of eight clock pulses $K_n$, the storage periods of these stages overlapping one another. During their respective periods, the stages of register 114 are successively sampled by a reading-control circuit 116 comprising eight AND gates $116_1$ – $116_8$. Each of these AND gates has a first input energizable by a pulse stored in the corresponding register stage, a second input connected to receive the reading pulse $d_n$ from lead $110_n$, and a third lead tied to a respective output of counter 113 for sequential energization by respective counting pulses $a_1$ – $a_8$. All the AND gates of circuit 116 work into a common OR gate 117 which synthesizes the pulse sequence $\sigma'_n$ from their readout pulses $r_1$ – $r_8$ and delivers that sequence to another OR gate 118 of multiplexer 108; the latter is also fed similar pulse sequences from corresponding OR gates of the remaining memory sections to combine them into outgoing word $\sigma^*$.

AND gate 115 also supplies its output pulses $v_1$ to an input of a flip-flop 119 which is alternately set and reset by these pulses and in its set condition generates a timing signal $\gamma_5$ fed to an input of an AND gate 120. Another flip-flop 121 is alternately settable and resettable by output pulses $\gamma_8$ from an AND gate 122 receiving in its inputs the counting pulses $a_2$ of counter 113 and the pulses $d_{n+1}$ of lead $111_n$ trailing the reading pulses $d_n$. Another such AND gate 123 has one input connected to lead $109_n$, which carries the leading pulses $d_{n-1}$, and on its other input receives the counting pulses $a_1$ of counter 113; gate 123 periodically generates a pulse $\gamma_9$ which, along with pulse $\gamma_8$ from gate 122, is fed through an OR gate 124 to a second input of AND gate 120 as a twin pulse $\gamma_3$. Flip-flop 121, when set, generates an unblocking signal $\gamma_2$ directed to a third input of AND gate 120. The latter, when conducting, produces a trigger pulse $\gamma_6$ for the setting input of a flip-flop 125 whose resetting input is connected to lead $110_n$ carrying the reading pulses $d_n$. The set output of flip-flop 125 is a corrective pulse $\gamma_7$ which advances the counter 113 by a counter of $k/2 =$ , 4. Since, as will be apparent hereinafter, signal $\gamma_7$ is generated only when the count of unit 113 stands at either one or two so that the last one of its three cascaded binary stages is not set, the output of flip-flop 123 may be simply connected to a setting input of that third binary stage.

The operation of the system shown in FIGS. 1 and 2 will now be described with reference to FIG. 3 which shows the following signals in its several graphs starting at the top:

- primary clock pulses $K_n$ individual to the memory section of FIG. 2;
- secondary clock pulse K* common to all memory sections;
- arbitrary configuration of an incoming pulse train $\sigma_n$;
- reading pulses $v_1$ – $v_8$ generically designated $v_i$;
- stored bits $z_1$ – $z_8$ in register stations $114_1$ – $114_8$;
- signals $\gamma_9$, $\gamma_8$ and $\gamma_2$ – $\gamma_7$.

The pulses $\gamma_4$ in the fourth-lowest graph, not mentioned heretofore, constitute a monitoring signal which does not actually come into existence in the network of FIG. 2 but occurs within AND gate 120 upon the simultaneous presence of pulses $\gamma_2$ and $\gamma_3$.

The reading pulses $d_{n-1}$, $d_n$ and $d_{n+1}$ have been represented in the second graph by some of the secondary clock pulses K* with which they coincide and which occur at approximately four times the cadence of primary clock pulses $K_n$, it being assumed that the bits of four incoming messages are to be interleaved in the outgoing word. Pulse train K* also includes a supplemental bit $d_x$ per scanning cycle for the aforementioned supervisory and synchronizing purposes, the number of bits K* in a cycle being thus 33 in this particular case; in some instances a greater number of supplemental bits may have to be provided. The same graph also shows the counts $a_1$ – $a_8$ of device 113 stepped by the reading pulses $d_n$. The readout pulses $r_1$ – $r_8$, coinciding with these reading pulses, have been indicated in graphs $z_1$ – $z_8$ to show their time positions with reference to the storage periods of the corresponding register stages.

Timing signal $\gamma_5$, which comes into existence and terminates on the trailing edges of alternate writing pulses $v_1$, has a duration equaling the length of the overlapping storage periods of register stages $114_1$ – $114_8$ and coincides with every other storage period of stage $114_1$. This duration approximately equals the length of a scanning cycle which encompasses 33 clock pulses K* and is normally measured by the signal $\gamma_2$ appearing or disappearing on the trailing edges of alternate pulses $\gamma_8$. The purpose of monitoring signal $\gamma_4$ is to detect a near-coincidence of signals $\gamma_2$ and $\gamma_5$ and, in that event, to generate the shift pulse $\gamma_6$ giving rise to the corrective signal $\gamma_7$ which causes the re-establishment of a more favorable sampling position with signals $\gamma_2$ and $\gamma_5$ staggered by about half a scanning cycle.

Figure 3:
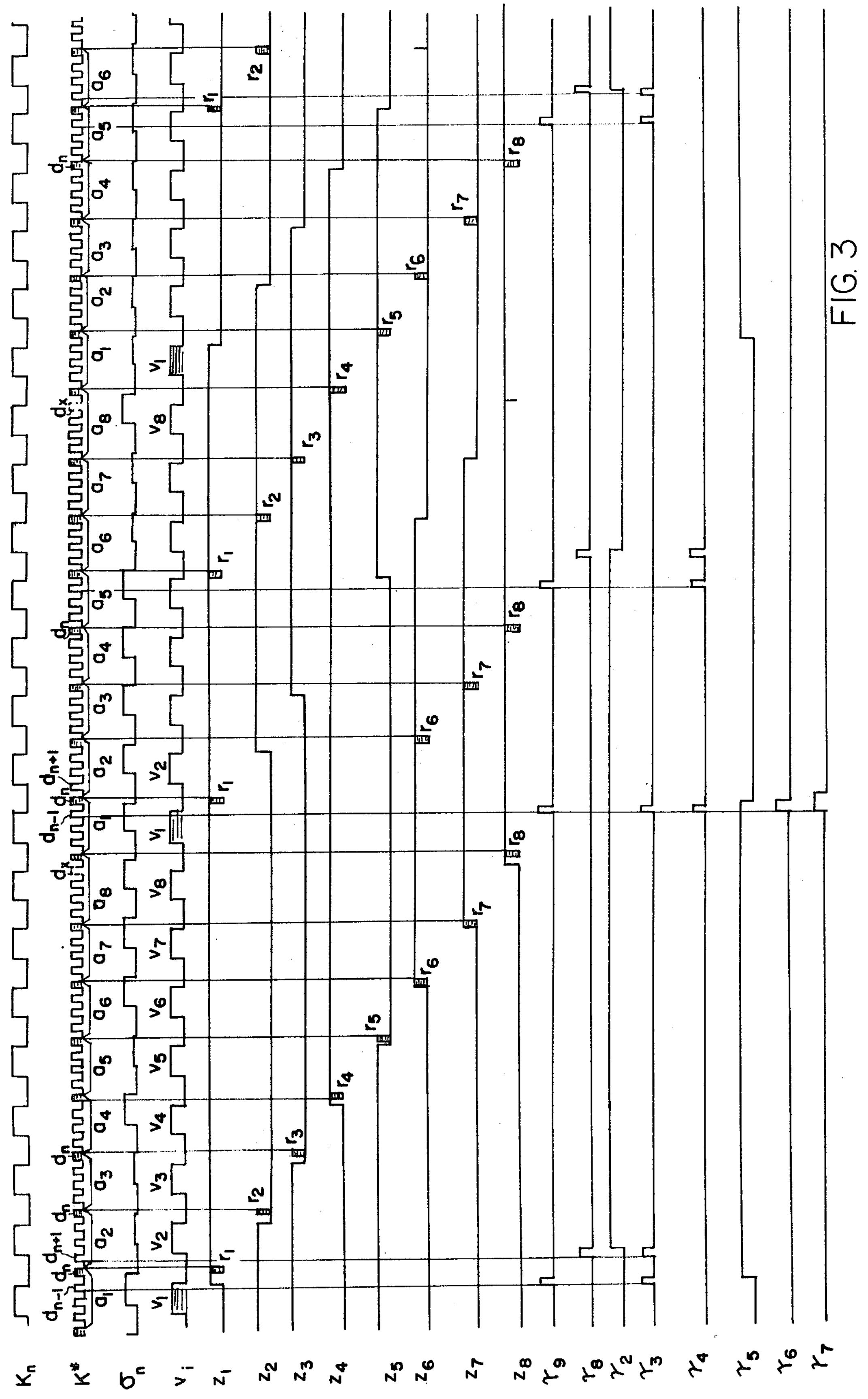
FIG. 3 is a set of graphs serving to explain the operation of the system.

In the left-hand portion of FIG. 3 the leading edges of signals $\gamma_2$ and $\gamma_5$ are so close together that the twin pulses $\gamma_3$ from OR gate 124, flanking the reading pulse $d_1$ and immediately preceding the signal $\gamma_2$, coincide with the beginning of signal $\gamma_5$. In this particular scanning cycle, however, the monitoring signal $\gamma_4$ is suppressed since signal $\gamma_2$ is zero, thereby failing to unblock the AND gate 120 which otherwise conducts upon the simultaneous occurrence of signals $\gamma_3$ and $\gamma_5$. At the beginning of the next cycle, with counter 113 energizing its output $a_1$, leading pulse $d_{n-1}$ gives rise to a pulse $\gamma_3$ at an instant when unblocking signal $\gamma_2$ has a finite value; since at that moment the timing signal $\gamma_5$ is still in existence, shift signal $\gamma_6$ is generated to set the flip-flop 125 for emission of the corrective pulse $\gamma_7$ which loads the counter 113 and terminates only on the trailing edge of the immediately following reading pulse $d_n$. Counter 113 is advanced by five steps so that its count jumps from $a_1$ to $a_6$. The skipping of count $a_2$ suppresses the normally following pulse $\gamma_8$ so that unblocking pulse $\gamma_2$ is not terminated until the count $a_2$ recurs about half a scanning cycle later, i.e., at the end of the monitoring signal $\gamma_4$ generated during that cycle.

Thus, the readout pulses $r_1$ – $r_8$ are shifted from positions near the beginnings of the respective storage periods to substantially the midpoints of these periods so that no loss of information occurs as would have been the case if the shift had not been performed, owing to the fact that the 33-pulse operating cycle of scanner 106 is slightly shorter than the 8-bit message cycle corresponding to the storage period of register 114. If the scanning cycle were longer than the storage period, the readout pulses would gradually approach the tail ends of their storage periods whereupon a trailing pulse $d_{n+1}$ would give rise to a pulse $\gamma_3$ generating the corrective pulse $\gamma_7$ just after the stepping of counter 113 by a reading pulse $d_n$. In that event the unblocking signal $\gamma_2$ is normally terminated and the corrective signal $\gamma_7$ lasts to the trailing edge of the reading pulse $d_n$ of the next subcycle; the count of unit 113 then jumps from $a_2$ to $a_7$, with resumption of normal operation upon the following count of $a_1$.

It will be apparent that flip-flop 119 could be replaced by a monoflop with an off-normal time corresponding to a storage period and that pulses $d_n$ and $d_{n+1}$ could be derived within the corresponding memory section, e.g. by suitable delay networks, from a pulse $d_{n-1}$ transmitted by the central scanner 106. These and other modifications obvious to persons skilled in the art are intended to be embraced within the spirit and scope of our invention as defined in the appended claims.

We claim:

1. A time-sharing system for the transmission of several incoming messages in interleaved relationship over an outgoing signal path, comprising:

a plurality of memory sections each including a register with a multiplicity of stages for the temporary storage of elemental units of a respective incoming message;

a source of clock pulses for each memory section;

distributing means in each memory section responsive to said clock pulses for enabling the stages of said register in cyclic succession to store incoming elemental message units for overlapping periods of $k$ clock pulses, $k$ being the number of said stages;

a source of reading pulses common to all said memory sections, said reading pulses having a cadence substantially higher than that of said clock pulses and being delivered to each memory section during recurring scanning cycles at a rate of k reading pulses per cycle, the length of a scanning cycle being approximately equal to that of a storage period of any of said memory sections;

multiplexing means controlled by said reading pulses for sampling the contents of respective register stages of each memory section, one stage at a time, during $k$ consecutive subcycles of any scanning cycle and for transmitting said contents in the order of their sampling over said outgoing signal path, said multiplexing means including a set of $k$ normally blocked readout gates for said stages and a cyclic counter with a counting capacity k for said reading pulses adapted to unblock said gates in a predetermined sequence;

a first signal generator in each memory section controlled by said clock pulses for producing a succession of timing signals substantially coextensive with alternate storage periods of one stage;

a second signal generator in each memory section controlled by said counter for producing, in the presence of a predetermined count, a monitoring signal lasting substantially less than a scanning cycle and bracketing the reading pulse which unblocks the readout gate of said one stage, said monitoring signal normally occurring once every two scanning cycles; and logical circuitry connected to said generator for detecting a coincidence of said monitoring signal with a timing signal and, upon such coincidence, transmitting to said counter a corrective signal modifying the count thereof to an extent shifting said monitoring signal to an interval between successive timing signals.

2. A system as defined in claim 1, further comprising timing means controlling said second signal generator in response to said corrective signal for preventing the recurrence of said monitoring signal for more than one scanning cycle following the modification of said count.

3. A system as defined in claim 2 wherein said source is operative to provide each memory section with a leading pulse and a trailing pulse together with each reading pulse, said second signal generator including first gate means unblocked by said counter upon a certain count thereof for passing said leading pulse and second gate means unblocked by said counter upon the next-following count for passing said trailing pulse, said monitoring signal encompassing the leading and trailing pulses passed by said first and second gate means, said timing means being triggerable by alternate trailing pulses passed by said second gate means to generate a succession of blocking and unblocking signals for said second signal generator.

4. A system as defined in claim 3 wherein said timing means comprises a flip-flop with a common setting and resetting input.

5. A system as defined in claim 3 wherein the reading and trailing pulses transmitted to each memory section coincide with respective reading pulses transmitted to two other memory sections.

6. A system as defined in claim 1 wherein said corrective signal is effective to increase said count by $k/2$.

7. A system as defined in claim 1 wherein said distributing means comprises another cyclic pulse counter connected to be stepped by said clock pulses.

8. A system as defined in claim 7 wherein said register is provided with $k$ writing gates having first inputs energizable in parallel by said clock pulses and second inputs individually energizable in cyclic succession by said other pulse counter, said first signal generator being connected to an output of one of said writing gates for actuation thereby.

9. A system as defined in claim 8 wherein said first signal generator comprises a flip-flop with a common setting and resetting input.

10. A system as defined in claim 1 wherein said logical circuitry includes a bistable circuit settable by the joint occurrence of said monitoring and timing signals and resettable by the trailing edge of any subsequent reading signal for generating said corrective signal.

* * * * *